United States Patent
Wei et al.

(10) Patent No.: US 10,586,044 B2
(45) Date of Patent: Mar. 10, 2020

(54) ABNORMAL BEHAVIOR DETECTION MODEL BUILDING APPARATUS AND ABNORMAL BEHAVIOR DETECTION MODEL BUILDING METHOD THEREOF

(71) Applicant: Institute For Information Industry, Taipei (TW)

(72) Inventors: Te-EN Wei, Taipei (TW); Chih-Hung Hsieh, Taoyuan (TW); Hsiang-Tsung Kung, Taipei (TW)

(73) Assignee: Institute For Information Industry, Taipei (TW)

( * ) Notice: Subject to any disclaimer, the term of this patent is extended or adjusted under 35 U.S.C. 154(b) by 192 days.

(21) Appl. No.: 15/839,839

(22) Filed: Dec. 12, 2017

(65) Prior Publication Data
US 2019/0180030 A1    Jun. 13, 2019

(51) Int. Cl.
*G06F 21/56* (2013.01)
*G06N 20/00* (2019.01)
*G06F 21/55* (2013.01)

(52) U.S. Cl.
CPC .......... *G06F 21/563* (2013.01); *G06F 21/552* (2013.01); *G06F 21/566* (2013.01); *G06N 20/00* (2019.01)

(58) Field of Classification Search
CPC ............................. G06F 21/563; G06N 20/00
USPC .......................................................... 726/23
See application file for complete search history.

(56) References Cited

U.S. PATENT DOCUMENTS

| | | | |
|---|---|---|---|
| 9,705,904 B1 | 7/2017 | Davis et al. | |
| 2003/0225755 A1* | 12/2003 | Iwayama | G06F 16/355 |
| 2009/0016599 A1* | 1/2009 | Eaton | G06K 9/00335 |
| | | | 382/159 |
| 2016/0329044 A1 | 11/2016 | Cao et al. | |
| 2017/0262633 A1 | 9/2017 | Miserendino et al. | |
| 2017/0308613 A1 | 10/2017 | Zhu et al. | |
| 2018/0365248 A1* | 12/2018 | Zheng | G06F 17/277 |

OTHER PUBLICATIONS

The extended European Search Report rendered by the European Patent Office for European Patent Application No. 17206738.1, dated Jun. 20, 2018, 11 pages.
(Continued)

*Primary Examiner* — Kambiz Zand
*Assistant Examiner* — Aubrey H Wyszynski
(74) *Attorney, Agent, or Firm* — Skaar Ulbrich Macari, P.A.

(57) ABSTRACT

An abnormal behavior detection model building apparatus and an abnormal behavior detection model building method thereof are provided. The abnormal behavior detection model building apparatus analyzes the parts of speech of a plurality of program operation sequences in a plurality of program operation sequence data associated with abnormal behaviors to generate a plurality of word vectors and cluster the word vectors. Based on the result of the clustering, the abnormal behavior detection model building apparatus obtains a feature vector of each of the program operation sequence data, and perform a supervised learning for a classification algorithm by using the feature vectors so as to build an abnormal behavior detection model.

20 Claims, 6 Drawing Sheets

(56) References Cited

OTHER PUBLICATIONS

Weiwei Hu, Ying Tan; "Generating Adversarial Malware Examples for Black-Box Attacks Based on GAN"; URL:https://arxiv.org/pdf/1702.05983.pdf; Feb. 20, 2017; 7 pages.

Kunfeng Wang et al.; "Generative Adversarial Networks: Introduction and Outlook"; IEEE/CAA Journal of Automatica Sinica; vol. 4, No. 4; Sep. 15, 2017; pp. 588-598; 11 pages.

The extended European Search Report rendered by the European Patent Office for European Patent Application No. 17206750.6, dated May 30, 2018, 9 pages.

Kolter, Jeremy Z., et al., "Learning to Detect Malicious Executables in the Wild", KDD '04—Proceedings of the tenth ACM SIGKDD International Conference on Knowledge Discovery and Data Mining, Aug. 22, 2004, pp. 470-478, 9 pages.

Awad, Yara et al., "Modeling Malware as a Language", Project Poster, Jan. 1, 2017, 1 page.

Nagano, Yuta, et al., "Static Analysis with Paragraph Vector for Malware Detection", Proceedings of the 11th International Conference on Ubiquitous Information Management and Communication, IMCOM '17, Jan. 5, 2017, pp. 1-7, 7 pages.

\* cited by examiner

```
loc_100010EE:                    ; CODE XREF: .text:loc_100010BC↑↓j
        push    esi
        push    edi
        push    ecx
        xor     ecx, edi
        dec     ecx
        pop     ecx
        push    ebx
        push    ebx
        sub     ebx, ebp
        sub     ebx, edx
        lea     ebx, [esi+60B1445Ah]
        mov     ebx, 2F2278h
        sub     ebx, 0F2F22278h
        xchg    ebx, [esp]
        push    edx
        inc     edx
        dec     edx
        add     edx, ebx
        sub     edx, ecx
        pop     edx
        pop     ebp
        xor     eax, eax
        cmp     eax, 1
        jz      loc_1001301
        mov     ebp, [esp+18h]
        jmp     short loc_1001159
```

POSD

ABNORMAL BEHAVIOR DETECTION MODEL BUILDING APPARATUS AND ABNORMAL BEHAVIOR DETECTION MODEL BUILDING METHOD THEREOF

FIELD

The present invention relates to an abnormal behavior detection model building apparatus and an abnormal behavior detection model building method. Specifically, the abnormal behavior detection model building apparatus of the present invention builds an abnormal behavior detection model according to a plurality of program operation sequences in a plurality of program operation sequence data associated with abnormal behaviors.

BACKGROUND

With the rapid development of science and technology, people are also increasingly relying on computers and the Internet. For a wide variety of purposes, people with bad intentions can hack the servers/computers on the Internet through system vulnerabilities or malicious programs to steal data or crash the system.

To deal with these hacking behaviors, the current prior art adopts the detection mechanism of signature-based or static features for protection. However, these detection mechanisms are based on the pre-determined signatures or static features to determine the abnormal behavior of the program operation, so the detection means are limited to a fixed form and difficult to resist the malicious programs with confusion features. In addition, dynamic analysis is often limited by the Sandbox environment settings. Therefore, when the malware's behavior sequence varies in length and is impure, it is hard to find a general feature pattern as a basis for judging the abnormal behavior of the program.

In view of the above, how to establish an abnormal behavior detection model that does not depend on predetermined signatures or static features and is not affected by different Sandbox environment settings is urgent needed for the industry.

SUMMARY

The object of the present invention is to provide an abnormal behavior detection model. The present invention in certain embodiments performs part-of-speech analysis of a plurality of program operation sequences of a plurality of program operation sequence data associated with abnormal behaviors to generate a plurality of word vectors, and clusters the word vectors. Based on the result of the clustering, the present invention obtains a feature vector of each of the program operation sequence data, and perform a supervised learning for a classification algorithm by using the feature vectors so as to build an abnormal behavior detection model. Different from the prior art, the abnormal behavior detection model built by the present invention can obtain the feature vectors of the program operation sequence data based upon the part-of-speech clustering result of the words in the program operation sequences, so the present invention can effectively detect and resist the malicious program with confusion features without relying on pre-determined signatures or static features and being influenced by the different Sandbox environment settings.

The disclosure includes an abnormal behavior detection model building apparatus comprising a storage and a processor. The storage is configured to store a plurality of program operation sequence data and a plurality of behavior labels. Each of the program operation sequence data records a plurality of program operations sequences. Each of the program operation sequence data corresponds to one of the behavior labels. The processor is electrically connected to the storage, and is configured to execute the following operations: computing the program operation sequences of the program operation sequence data through a word embedding model to generate a plurality of word vectors, each of the word vectors corresponding to one of the program sequences; clustering the word vectors into a plurality of word vector groups based on a clustering algorithm; comparing the program operation sequences of each program operation sequence data with at least one program operation sequence corresponding to at least one of the word vectors including in each of the word vector groups to generate a feature vector of each program operation sequence data; performing a supervised learning of a classification algorithm to generate a classifier for classifying the feature vectors to correspond to the behavior labels based on the feature vectors and the behavior labels, building an abnormal behavior detection model based on the class of word vectors and the classifier.

The disclosure also includes an abnormal behavior detection model building method for an abnormal behavior detection model building apparatus. The abnormal behavior detection model building apparatus includes a storage and a processor. The storage is configured to store a plurality of program operation sequence data and a plurality of behavior labels. Each of the program operation sequence data records a plurality of program operation sequence. Each of the program operation sequence data corresponds to one of the behavior labels. The abnormal behavior detection model building method is executed by the processor and comprises following steps of: computing the program operation sequences of the program operation sequence data through a word embedding model to generate a plurality of word vectors, each of the word vectors corresponds to one of the program operation sequences; clustering the word vectors into a plurality of word vector groups based on a clustering algorithm; comparing the program operation sequences of each program operation sequence data with at least one program operation sequence corresponding to at least one of the word vectors included in each of the word vector groups to generate a feature vector of each of the program operation sequence data; performing a supervised learning of a classification algorithm based on the feature vectors and the behavior labels to generate a classifier for classifying the feature vectors to correspond to the behavior labels; and building an abnormal behavior detection model based on the word vector groups and the classifier.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 2A is a schematic diagram of a program operation sequence data;

FIG. 2B is a schematic view of another program operation sequence data;

DETAILED DESCRIPTION

In the following description, the present invention will be explained with reference to certain example embodiments thereof. However, these example embodiments are not intended to limit the present invention to any specific examples, embodiments, environment, applications or implementations described in these example embodiments. Therefore, description of these example embodiments is only for purpose of illustration rather than to limit the scope of the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
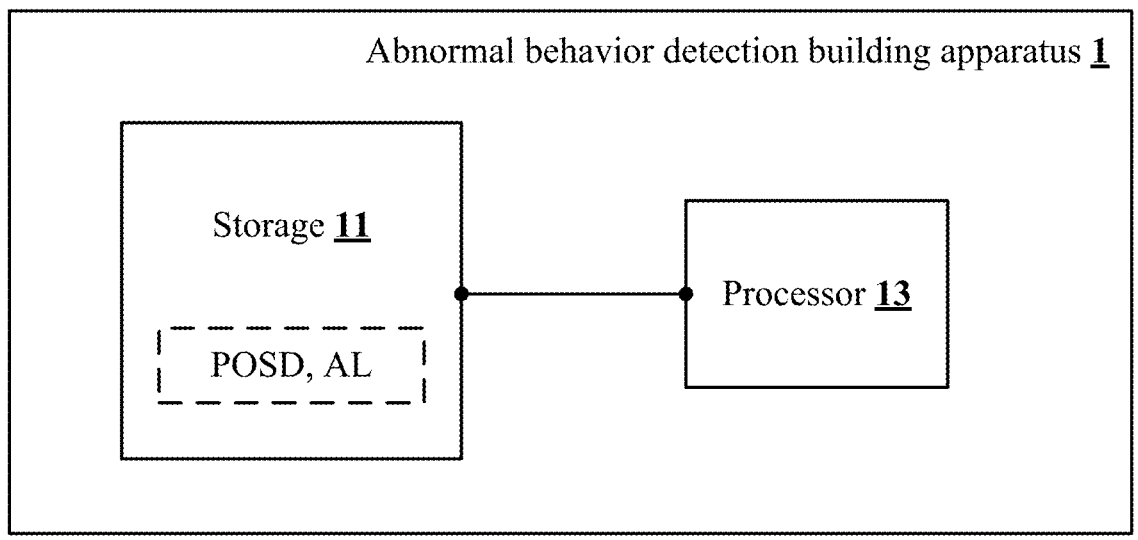
FIG. 1 is a schematic view of an abnormal behavior detection model building apparatus 1 according to the present invention.

The first embodiment of the present invention is shown in FIGS. 1-4. FIG. 1 is a schematic view of an abnormal behavior detection model building apparatus 1 according to the present invention. The abnormal behavior detection model building apparatus 1 comprises a storage 11 and a processor 13. The processor 13 is electrically connected to the storage 11. The storage 11 is configured to store a plurality of program operation sequence data POSD and a plurality of behavior labels AL. Each of the program operation sequence data POSD records a plurality of program operation sequences. For example, the program operation sequences may be a dynamic program operation sequence, such as an Application Programming Interface (API) sequence and a system call sequence, but not limited thereto. In an embodiment, the dynamic program operation sequence can be captured by a tracking program. For another example, the program operation sequences may also be a static program operation sequence, such as an operation code (Opcode) sequence, but not limited thereto. In an embodiment, the static program operation sequence can be obtained through a decompile program.

The program operation sequence data POSD corresponds to the behavior labels AL (e.g., a normal behavior label, an abnormal behavior label, etc., but not limited thereto). In an embodiment, the program operation sequence data POSD includes a plurality of abnormal program operation sequence data, and each of the abnormal program operation sequence data is associated with a malicious program. In this case, the behavior labels AL may further include an Adware program, a Worm program, a Trojan program, etc., but are not limited thereto.

Taking the Opcode sequences as an example, as shown in FIG. 2A, it is an example of a program operation sequence datum POSD, and the program operation sequences contained therein are Opcode sequences. It should be noted that based on layout restrictions, the Opcode sequences shown in FIG. 2A are only parts of the program operation sequence datum POSD. The processor 13 computes the program operation sequences of the program operation sequence data POSD through a word embedding model, such as a Word-to-Vector (Word2Vec) model or a One-Hot Encoding model to generate a plurality of word vectors. Each word vector corresponds to one of the program operation sequences.

For example, the program operation sequences includes "xor", "sub", "add", "and", "push", "pop", "xchg", "inc", "cmp", "jmp" "Jz", the processor 13 computes the program operation sequences through the word embedding model and generates the word vectors V1-V11 corresponding to the program operation sequences, respectively. It is assumed here that the word vector V1 corresponds to "xor", the word vector V2 corresponds to "sub", the word vector V3 corresponds to "add", the word vector V4 corresponds to "and", the word vector V5 corresponds to "push", the word vector V6 corresponds to "pop", the word vector V7 corresponds to "xchg", the word vector V8 corresponds to "inc", the word vector V9 corresponds to "cmp", the word vector V10 corresponds to "jmp", the word vector V11 corresponds to "jz".

Figure 2B:
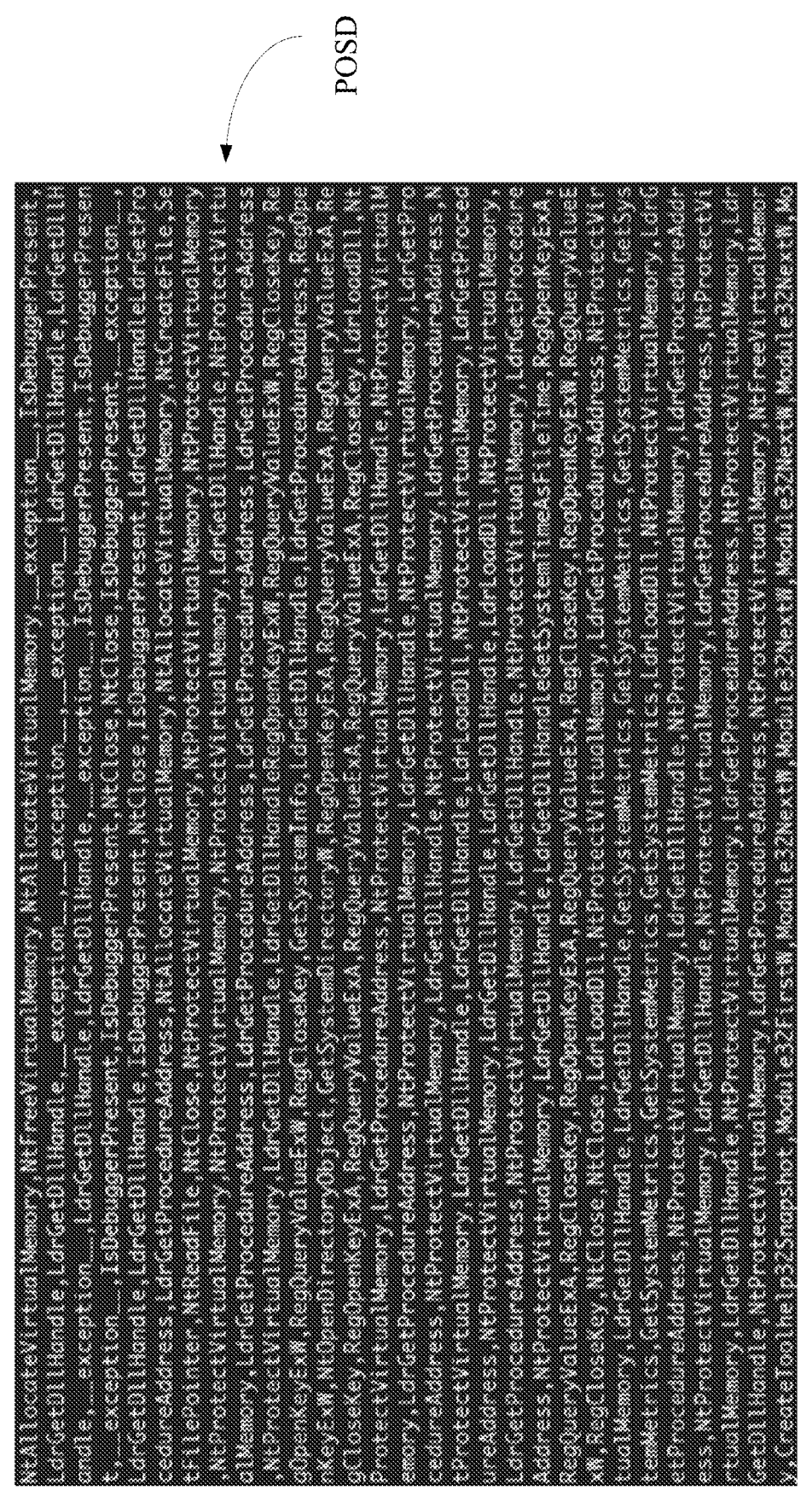

In addition, taking the API sequences as an example, as shown in FIG. 2B, it is an example of the program operation sequence datum POSD. It should be noted that based on layout restrictions, the API sequences shown in FIG. 2B are only parts of the program operation sequence datum POSD. Similarly, the processor 13 can compute the program operation sequences of the program operation sequence data POSD through the word embedding model to generate a plurality of word vectors. Each word vector corresponds to one of the program operation sequences.

For example, the program operation sequence includes "GetSystemInfo", "GetFileSize", "GetSystemDirectoryW", "GetSystemMetrics", "RegQueryValueExA", "RegOpenKeyExA", "LdrLoadDll", "NtCreatFile", "NtReadfile", "NtClose", "NtOpenDirectoryObject", the processor 13 computes the program operation sequences through the word embedding model and generates the word vectors V1-V11 corresponding to the program operation sequences, respectively. Here, it is assumed that the word vector V1 corresponds to "GetSystemInfo", the word vector V2 corresponds to "GetFileSize", the word vector V3 corresponds to "GetSystemDirectoryW", the word vector V4 corresponds to "GetSystemMetrics", the word vector V5 corresponds to "RegQueryValueExA", the word vector V6 corresponds to "RegOpenKeyExA", the word vector V7 corresponds to "LdrLoadDll", the word vector V8 corresponds to "NtCreatFile", the word vector V9 corresponds to "NtReadfile", the word vector V10 corresponds to "NtClose", the word vector V11 corresponds to "NtOpenDirectoryObject".

Figure 3:
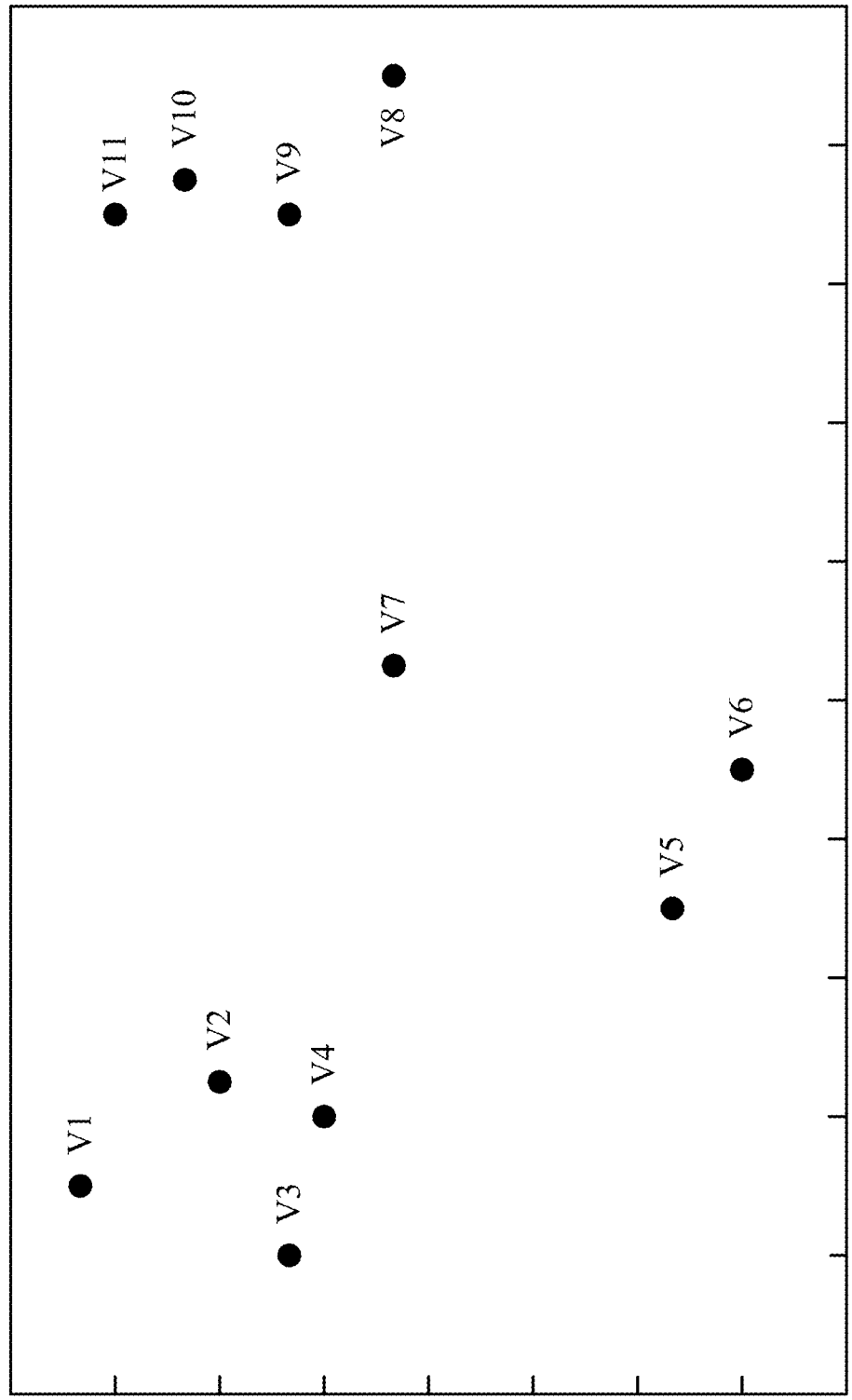
FIG. 3 depicts the distribution of each word vector in a two-dimensional space.

FIG. 3 shows a word vector distribution space WVD. It should be noted that, in order to simplify the explanation, the word vector distribution space WVD in this embodiment represents the distribution of the word vectors in a two-dimensional space. However, in practice, according to the type of program operation sequence data, developers can decide on the dimension of the word vector distribution space WVD. Since those of ordinary skill in the art can know how to set the spatial dimension of the output, it will not be further described here.

In the word vector distribution space WVD, the word vectors whose positions are close have the similar part of speech or semantic meaning. Therefore, the present invention clusters these word vectors according to a clustering algorithm of unsupervised learning as a basis for subsequently retrieving features of each of the program operation sequence data POSD. In the present invention, the clustering algorithm may be one of an Affinity Propagation (AP) clustering algorithm, a Spectral clustering algorithm, a Fuzzy C-means (FCM) clustering algorithm, an Iterative Self-Organizing Data Analysis Technique Algorithm (ISODATA) clustering algorithm, a K-means clustering algorithm, a Complete-Linkage (CL) clustering algorithm, a Single-Linkage (SL) clustering algorithm and a Ward's method clustering algorithm, but not limited thereto.

Figure 4:
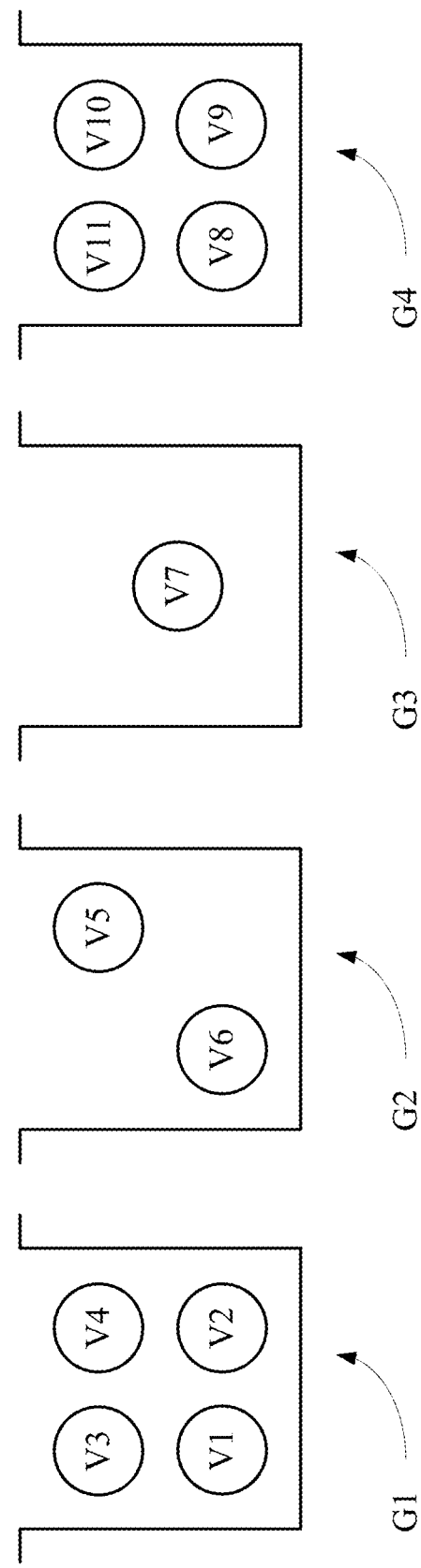
FIG. 4 depicts each word vector group after clustering.

For example, the processor 13 clusters the word vectors into four word vector groups G1-G4 according to the AP clustering algorithm, as shown in FIG. 4. The word vector group G1 includes the word vectors V1-V4, the word vector group G2 includes the word vectors V5-V6, the word vector group G3 includes the word vectors V7, and the word vector group G4 includes the word vectors V8-V11. It should be note that the number of word vector groups can be determined by the developer himself/herself by setting the parameters of the clustering algorithm (e.g., directly setting the number of required groups, or setting the number of iterations performed by the clustering algorithm). Since the detailed operation of clustering based on the clustering algorithm can be understood by those of ordinary skill in the art, it will not be further described here.

After obtaining the word vector groups, the processor 13 severally compares the program operation sequences of the program operation sequence data POSD with at least one program operation sequence corresponding to at least one word vectors included in each word vector group to generate a feature vector of each of the program operation sequence data POSD. For example, it is assumed that in a program operation sequence data POSD, there are program operation sequences corresponding to the word vector V2, the word vector V6, the word vector V8 and the word vector V11. Thus, for this program operation sequence data POSD, the feature value of the word vector group G1 is 1, the feature value of the word vector group G2 is 1, the feature value of the word vector group G3 is 0, and the feature value of the word vector group G4 is 2, so the feature vector of the program operation sequence data POSD is (1,1,0,2). For another example, it is assumed that in another program operation sequence data POSD, there are program operation sequences corresponding to the word vector V1, the word vector V2, the word vector V4, the word vector V5, the word vector V7, the word vector V9, and the word vector V10. Thus, for the another program operation sequence data POSD, the feature value of the word vector group G1 is 3, the feature value of the word vector group G2 is 1, the feature value of the word vector group G3 is 1, and the feature value of the word vector group G4 is 2, so the feature vector of the another program operation sequence data POSD is (3,1,1,2).

It should be noted that the aforementioned comparison for generating the feature vectors is implemented based on whether each of the program operation sequence data POSD has the at least one program operation sequence corresponding to at least one the word vector included in each word vector group. However, in other embodiments, the comparison for generating the feature vectors may also be implemented based on how many at least one program operation sequence corresponding to at least one at least one the word vector included in each word vector group in each of the program operation sequence data POSD. For example, it is assumed that there are five program operation sequences corresponding to the word vectors V2, three program operation sequences corresponding to the word vectors V6, one program operation sequence corresponding to the word vectors V8, and three program operations sequences corresponding to the word vector V11 in a program operation sequence data POSD. Thus, for this program operation sequence datum POSD, the feature value of the word vector group G1 is 5, the feature value of the word vector group G2 is 3, the feature value of the word vector group G3 is 0, and the feature value of the word vector group G4 is 4, so the feature vector of the program operation sequence datum POSD is (5, 3, 0, 4).

After generating the feature vectors of each of the program operation sequence data POSD, the processor 13 performs a supervised learning of a classification algorithm to generate a classifier, according to the feature vectors and the behavior labels AL. For example, the classification algorithm may be one of a Support Vector Machine (SVM) algorithm, a Decision Tree (DT) algorithm, a Bayes algorithm, and a Nearest Neighbors (NN) algorithm, but it is not limited thereto. The foregoing supervised learning is performed in order to classify the feature vectors into the appropriate categories through the classification algorithm so as to correspond to the behavior labels AL. For example, the program operation sequence data POSD corresponding to the malicious advertisement program label can be reliably classified into the same category, the program operation sequence data POSD corresponding to the worm program label can be reliably classified into the same category, the program operation sequence data POSD corresponding to the Trojan label can be reliably classified into the same category, and the program operation sequence data POSD corresponding to the normal behavior label can be reliably classified into the same category. Finally, the processor 13 builds an abnormal behavior detection model according to the word vector groups and the classifier.

In other embodiments, after building the abnormal behavior detection model, the processor 13 may test the abnormal behavior detection model according to a plurality of test program operation sequence data. Based on a detection rate, the processor 13 determines the accuracy rate of the abnormal behavior detection model identifies the test program operation sequence data so that the developer can re-perform the foregoing training to build an abnormal behavior detection model by adjusting related parameter settings of the word embedding model, the clustering algorithm and the classification algorithm according to the accuracy rate. Accordingly, the present invention can build different abnormal behavior detection models for different types of program operation sequence data through the foregoing operation, so as to detect abnormal behavior of various dynamic program operation sequences or static program operation sequences.

Moreover, the abnormal behavior detection model built by the present invention can be compiled into an executable program and run on an operating system to provide the operating system to detect abnormal behaviors (e.g., detecting malware, detecting illegal operations, etc.) In addition, all the program operation sequence data POSD used for building the abnormal behavior detection model according to the present invention may also be abnormal program operation sequence data (for example, all program operation sequence data are associated with malicious programs), so that the built abnormal behavior detection model can simply classify the data that has been identified as abnormal program operation sequence data. In other words, the abnormal behavior detection model built by the present invention can be used in cooperation with other abnormal behavior detection programs. When other abnormal behavior detection programs detect an abnormal program, the abnormal behavior detection model can further determine which category the program operation sequence data of the abnormal program belongs to. For example, the other abnormal behavior detection programs may be an anti-virus program. When the anti-virus program detects an abnormal program, the abnormal behavior detection model of the present invention may further help determine the category of the abnormal program.

Figure 5:
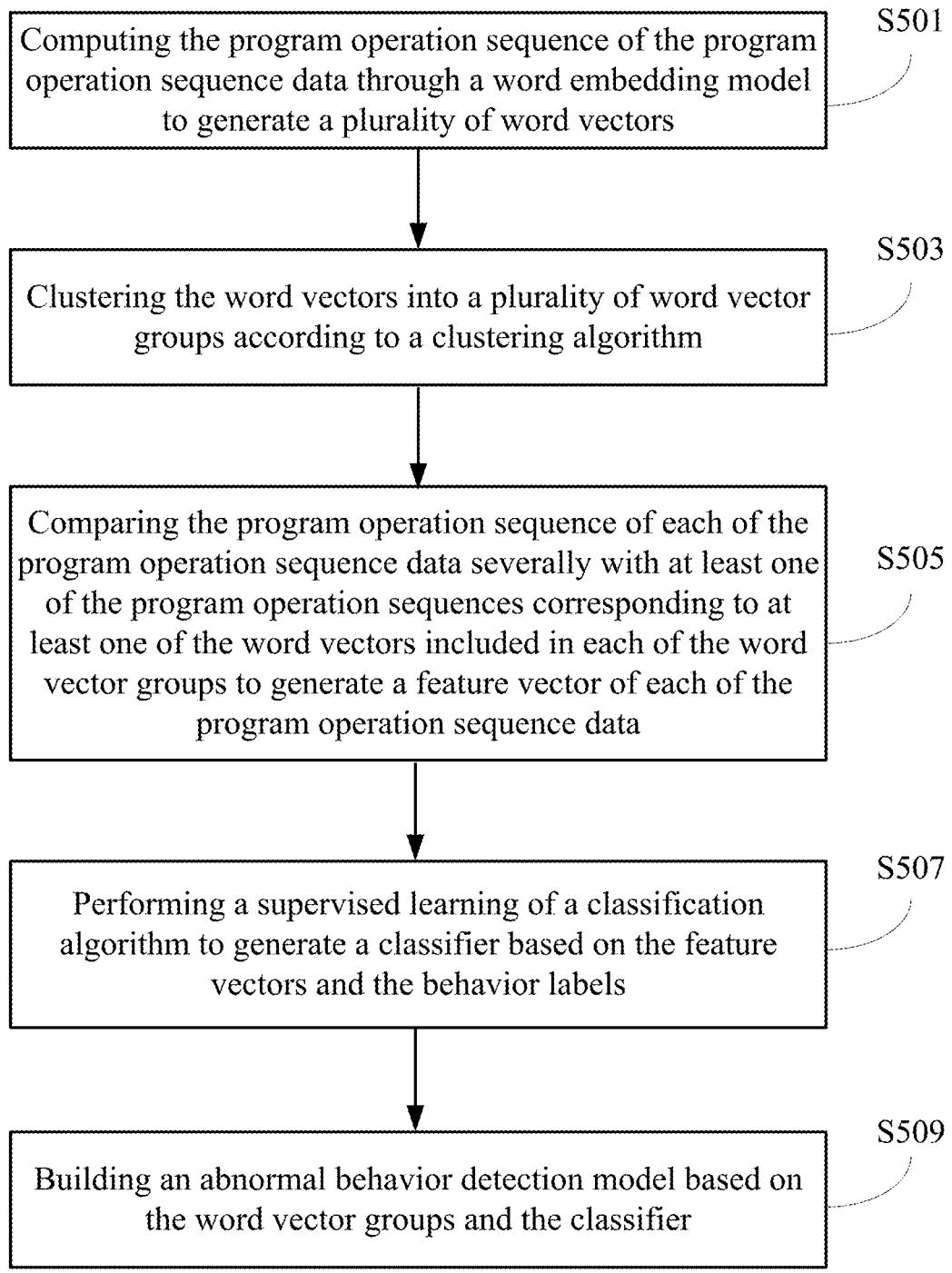
FIG. 5 is a flowchart diagram of an abnormal behavior detection building method according to the present invention.

A second embodiment of the present invention is shown in FIG. 5, which is a flowchart diagram of an abnormal behavior detection model building method according to the present invention. The abnormal behavior detection model building method is for use in an abnormal behavior detection model building apparatus (e.g., the abnormal behavior detection model building apparatus 1 in the foregoing embodiment). The abnormal behavior detection model building apparatus includes a storage and a processor. The storage stores a plurality of program operation sequence data and a plurality behavior labels. Each of the program operation sequence data records a plurality of program sequences. Each of the program operation sequence data corresponds to one of the behavior labels. Abnormal behavior detection model building method is executed by the processor.

First, step S501 is executed to compute the program operation sequences of the program operation sequence data through a word embedding model to generate a plurality of word vectors (e.g., the word vectors V1-V11 shown in FIG. 3). As previously described, each word vector corresponds to one of the program operation sequences. Next, step S503 is executed to cluster the word vectors into a plurality of word vector groups (e.g., the word vector groups G1 to G4 shown in FIG. 4) based on a clustering algorithm.

Then, step S505 is executed to compare the program operation sequences of each of the program operation sequence data severally with at least one of the program operation sequences corresponding to at least one of the word vectors included in each of word vector groups to generate the feature vectors of each of the program operation sequence data. Afterwards, step S507 is executed to perform a supervised learning of a classification algorithm based on the feature vectors and the behavior labels to generate a classifier. The classifier is used to classify the feature vectors to correspond to the behavior labels. Finally, at step S509, an abnormal behavior detection model is built according to the word vector groups and the classifier.

In other embodiments, the program operation sequences are one of a dynamic program operation sequence and a static program operation sequence. The dynamic program operation sequence is an Application Programming Interface (API) sequence or a system call sequence. The static program operation sequence is an Operation Code (Opcode) sequence. In an embodiment, the dynamic programming sequence is retrieved by a tracking program. In other embodiments, the word embedding model is one of a word-to-vector (Word2Vec) model and a One-Hot Encoding model.

In other embodiments, the clustering algorithm is one of an Affinity Propagation (AP) clustering algorithm, a Spectral clustering algorithm, a Fuzzy C-means (FCM) clustering algorithm Method, an Iterative Self-Organizing Data Analysis Technique Algorithm (ISODATA) clustering algorithm, a K-means clustering algorithm, a Complete-Linkage (CL) clustering algorithm, a Single-Linkage (SL) clustering algorithm and a Ward's method clustering algorithm.

In addition, in other embodiments, the classification algorithm is one of a Support Vector Machine (SVM) algorithm, a Decision Tree (DT) algorithm, a Bayes algorithm and a Nearest Neighbors (NN) algorithms.

In an embodiment, the program operation sequence data include a plurality of abnormal program operation sequence data, and each of the abnormal program operation sequence data is associated with a malicious program. In addition to the above steps, the abnormal behavior detection model building method in this embodiment can also execute all the steps described in the foregoing embodiments and have all the corresponding functions. Those of ordinary skill in the art can directly understand how this embodiment performs these operations and has these functions based on the foregoing embodiments, so details will not be further described herein.

In addition, the foregoing abnormal behavior detection model building method of the present invention may be implemented by a non-transitory computer readable medium. The non-transitory computer readable medium stores a computer program including a plurality of codes. After the computer program is loaded and installed in an electronic computing apparatus (e.g., the abnormal behavior detection model building apparatus 1), the codes comprised in the computer program are executed by the processor to execute the abnormal behavior detection model building method of the present invention. The non-transitory computer readable medium may be, for example, a read only memory (ROM), a flash memory, a floppy disk, a hard disk, a compact disk (CD), a universal serial bus (USB) disk, a magnetic tape, a database accessible to networks, or any storage media with the same function and well known to people skilled in this field.

According to the above descriptions, the present invention computes a plurality of program operation sequences of a plurality of program operation sequence data through a word embedding model to generate a plurality of word vectors and cluster the word vectors. The abnormal behavior detection model building apparatus obtains a feature vector of each of the program operation sequence data after clustering, and perform a supervised learning for a classification algorithm by using the feature vectors so as to build an abnormal behavior detection model. Accordingly, the abnormal behavior detection model of the present invention can obtain the feature vectors of the program operation sequence data based upon the part-of-speech clustering result of the program operation sequences, so that the malicious programs and the abnormal program operation behaviors with the confusion features can be effectively detected without relying on pre-determined signatures or static features and being influence by the different Sandbox environment settings.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An abnormal behavior detection model building apparatus, comprising:
   a storage, being configured to store a plurality of program operation sequence data and a plurality of behavior labels, each of the program operation sequence data recording a plurality of program operation sequences, each of the program operation sequence data corresponding to one of the behavior labels; and
   a processor electrically connected to the storage, being configured to execute the following operations:
       computing the program operation sequences of the program operation sequence data through a word embedding model to generate a plurality of word vectors, each of the word vectors corresponding to one of the program operation sequences;

clustering the word vectors into a plurality of word vector groups based on a clustering algorithm;

comparing the program operation sequences of each of the program operation sequence data severally with at least one of the program operation sequences corresponding to at least one of the word vectors included in each of the word vector groups to generate a feature vector of each of the program operation sequence data;

performing a supervised learning of a classification algorithm to generate a classifier for classifying the feature vectors to correspond to the behavior labels based on the feature vectors and the behavior labels; and building the abnormal behavior detection model based on the word vector groups and the classifier.

2. The abnormal behavior detection model building apparatus of claim 1, wherein the program operation sequences are one of a dynamic program operation sequence and a static program operation sequence.

3. The abnormal behavior detection model building apparatus of claim 2, wherein the dynamic program operation sequence is an Application Programming Interface (API) sequence.

4. The abnormal behavior detection model building apparatus of claim 2, wherein the dynamic program operation sequence is a system call sequence.

5. The abnormal behavior detection model building apparatus of claim 2, wherein the static program operation sequence is an Operation Code (Opcode) sequence.

6. The abnormal behavior detection model building apparatus of claim 2, wherein the dynamic program operation sequence is retrieved by a tracking program.

7. The abnormal behavior detection model building apparatus of claim 1, wherein the word embedding model is one of a Word-to-Vector (Word2Vec) model and a One-Hot Encoding model.

8. The abnormal behavior detection model building apparatus of claim 1, wherein the clustering algorithm is one of an Affinity Propagation (AP) clustering algorithm, a Spectral clustering algorithm, a Fuzzy C-means (FCM) clustering algorithm, an Iterative Self-Organizing Data Analysis Technique Algorithm (ISODATA) clustering algorithm, a K-means clustering algorithm, a Complete-Linkage (CL) clustering algorithm, a Single-Linkage (SL) clustering algorithm and a Ward's method clustering algorithm.

9. The abnormal behavior detection model building apparatus of claim 1, wherein the classification algorithm is one of a Support Vector Machine (SVM) algorithm, a Decision Tree (DT) algorithm, a Bayes algorithm and a Nearest Neighbors (NN) algorithm.

10. The abnormal behavior detection model building apparatus of claim 1, wherein the program operation sequence data include a plurality of abnormal program operation sequence data, and each of the abnormal program operation sequence data is associated with a malicious program.

11. An abnormal behavior detection model building method for an abnormal behavior detection model building apparatus comprising a storage and a processor, the storage being configured to store a plurality of program operation sequence data and a plurality of behavior labels, each of the program operation sequence data recording a plurality of program operation sequences, each of the program operation sequence data corresponding to one of the behavior labels, and the abnormal behavior detection model budding method being executed by the processor and comprising:

computing the program operation sequences of the program operation sequence data through a word embedding model to generate a plurality of word vectors, each of the word vectors corresponding to one of the program operation sequences;

clustering the word vectors into a plurality of word vector groups based on a clustering algorithm;

comparing the program operation sequences of each program operation sequence data severally with at least one of the program operation sequences corresponding to at least one of the word vectors included in each of the word vector groups to generate a feature vector of each of the program operation sequence data;

performing a supervised learning of a classification algorithm to generate a classifier for classifying the feature vectors to correspond to the behavior labels based on the feature vectors and the behavior labels; and building the abnormal behavior detection model based on the word vector groups and the classifier.

12. The abnormal behavior detection model building method of claim 11, wherein the program operation sequences are one of a dynamic program operation sequence and a static program operation sequence.

13. The abnormal behavior detection model building method of claim 12, wherein the dynamic program operation sequence is an Application Programming Interface (API) sequence.

14. The abnormal behavior detection model building method of claim 12, wherein the dynamic program operation sequence is a system call sequence.

15. The abnormal behavior detection model building method of claim 12, wherein the static program operation sequence is an Operation Code (Opcode) sequence.

16. The abnormal behavior detection model building method of claim 12, wherein the dynamic program operation sequence is retrieved by a tracking program.

17. The abnormal behavior detection model building method of claim 11, wherein the word embedding model is one of a Word-to-Vector (Word2Vec) model and a One-Hot-encoding model.

18. The abnormal behavior detection model budding method of claim 11, wherein the clustering algorithm is one of an Affinity Propagation (AP) clustering algorithm, a Spectral clustering algorithm, a Fuzzy C-means (FCM) clustering algorithm, an Iterative Self-Organizing Data Analysis Technique Algorithm (ISODATA) clustering algorithm, a K-means clustering algorithm, a Complete-Linkage (CL) clustering algorithm, a Single-Linkage (SL) clustering algorithm and a Ward's method clustering algorithm.

19. The abnormal behavior detection model building method of claim 11, wherein the classification algorithm is one of a Support Vector Machine (SVM) algorithm, a Decision Tree (DT) algorithm, a Bayes algorithm and a Nearest Neighbors (NN) algorithm.

20. The abnormal behavior detection model building method of claim 11, wherein the program operation sequence data include a plurality of abnormal program operation sequence data, and each of the abnormal program operation sequence data is associated with a malicious program.

* * * * *